Aug. 9, 1960 — L. C. MOTE — 2,948,321
METHOD OF AND MEANS FOR PROLONGING THE LIFE OF PNEUMATIC TIRES
Filed July 9, 1958

Witness
Edward P. Seeley

Inventor
Lewis Charles Mote
by M. Talbert Dick
Attorney

400
United States Patent Office 2,948,321
Patented Aug. 9, 1960

2,948,321

METHOD OF AND MEANS FOR PROLONGING THE LIFE OF PNEUMATIC TIRES

Lewis Charles Mote, 227 Filmore, Ottumwa, Iowa

Filed July 9, 1958, Ser. No. 747,376

4 Claims. (Cl. 152—330)

This invention relates to a method of and means for prolonging the useful life of pneumatic tires used on vehicles; such as automobiles, trucks, airplanes, tractors and like.

Substantially all modern vehicles use some type of air inflated resilient tired wheels. Such tires rather rapidly deteriorate and must be replaced. This deterioration is not entirely due to wear. Perhaps the chief hazard of tire failure is due to excessive heat generated in the tire from friction with the road or ground surface. Such undesirable heat not only affects and breaks down the materials that go to make up the tire, but due to the heat factor, the air pressure inside the tire fluctuates over a wide range. Therefore one of the principal objects of my invention is to provide a method of and a means for prolonging the useful life of pneumatic vehicle tires.

A further object of this invention is to provide a method of and means for dissipating heat especially from the tread of pneumatic tires.

A still further object of this invention is to provide a method of and means for restricting the air pressure variations of pneumatic tires.

A still further object of this invention is to provide a pneumatic tire preservative that may be used in either tubed or tubeless tires. A still further object of this invention is to provide a means for increasing the useful life of pneumatic tires that may be easily and quickly installed.

Still further objects of my invention are to provide a means for increasing the useful life of pneumatic tires that is economical in manufacture, and durable in use.

These and other objects will be apparent to those skilled in the art.

Figure 1:
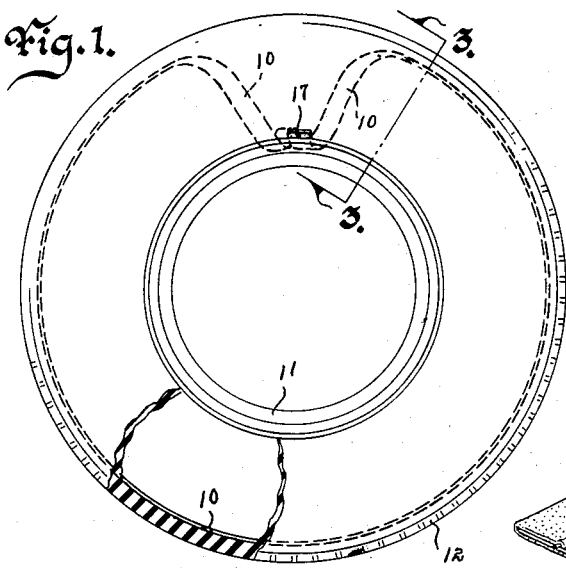
Figure 2:
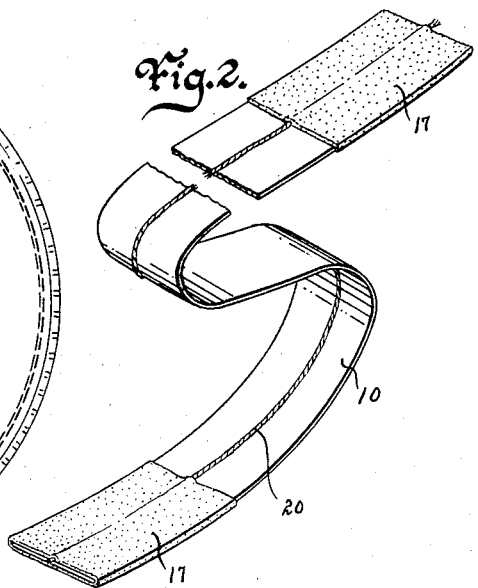
Figure 3:
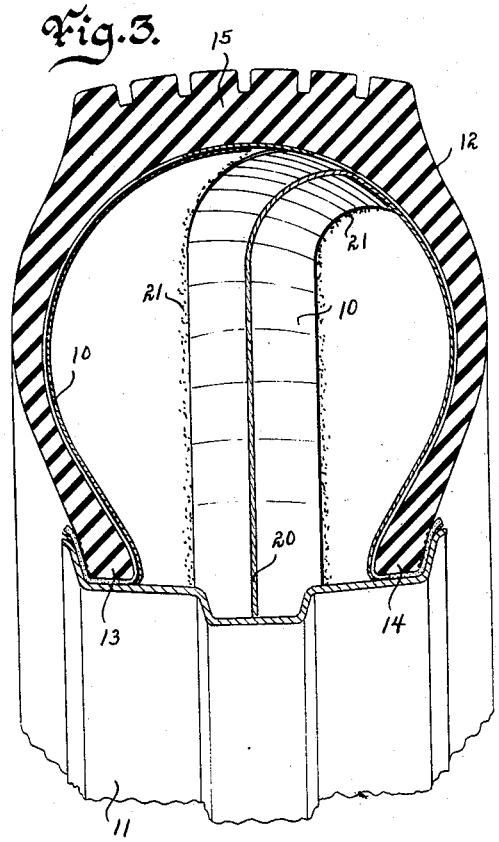
Figure 4:
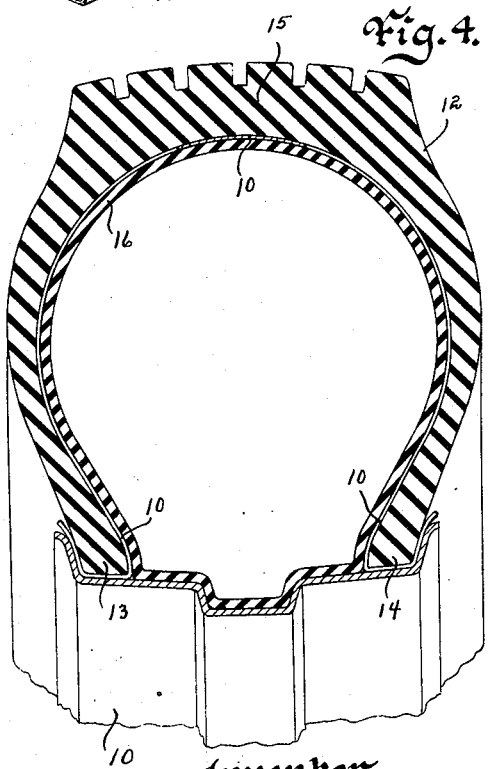

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a side view of a tubeless pneumatic tire using my device and with a section cut away to more fully illustrate the placement of the device, Fig. 2 is an enlarged perspective view of my metallic ribbon prior to being placed in a tire, Fig. 3 is an enlarged cross-sectional view of my ribbon device mounted in a tubeless tire which in turn is on a wheel rim. This view is taken on line 3—3 of Fig. 1, and Fig. 4 is an enlarged cross-sectional view of my device installed in a wheeled tire having an inner tube.

My device consists of an elongated flexible metallic ribbon 10 preferably of aluminum. In the drawings I have used the numeral 11 to designate a vehicle wheel rim. The numeral 12 generally designates an ordinary pneumatic tire having the two beads 13 and 14 and the tread portion 15. When the tire is mounted, its beads 13 and 14 extend into the channel of the rim as shown in Fig. 3 and Fig. 4. In Fig. 4 I show the usual inner tube 16 inside the tire casing 12. In use on a tubed tire I place my elongated metallic ribbon between the outer side of the inner tube and the inside of the tire casing as shown in Fig. 4. This ribbon extends substantially around the circumference of the inner tube and then has its two end portions extending to the outside atmosphere by having one end portion extending out between the bead 13 and the wheel rim and by having the other end portion extending out between the bead 14 and the wheel rim. The inner tube will yieldingly hold the major length of the ribbon onto the under tread portion 15 of the tire. In the case of tubeless tires I treat each end portion of the metallic ribbon with a coating of rubber-like material 17 as shown in Fig. 2 to prevent air leakage from the tire at the point where the ribbon passes under the beads 13 and 14, and between the beads and wheel rim. Any suitable means may be used to hold the major length of the ribbon onto and adjacent the under side of the casing tread as shown in Fig. 1. The ribbon may be glued to the inside of the casing or it may be tacked thereto by thread or like. To strengthen the ribbon and to aid in securing the same to the inside of the tire casing, I have secured a cord 20 to the entire longitudinal length of the ribbon. This cord may be of any suitable kind, but I recommend that it be nylon cord. Any suitable adhesive may be used to secure the cord 20 to the inside of the tire, when the ribbon is turned over from that shown in Fig. 3. In Fig. 3 I have the cord to the inner side of the ribbon and have used adhesive 21 to secure the ribbon to the casing. My ribbon has been extensively tested in pneumatic tires and results have been positive. There have, however, been different theories for its success. Obviously, it is a heat transfer means extending from the tread of the tire. Thus heat is transferred from the tread portion. Heat is also transferred from the air in the tire. From this position, the tire would not only run cooler, but there would be less expansion and contraction of the air pressure in the tire. Still another theory is that there is a considerable reduction of static electricity. Still another theory is that the aluminum foil ribbon oxidies and by oxidizing certain oxygen particles in the tire air are eliminated.

Some changes may be made in my method of and means for prolonging the life of pneumatic tires without departing from the real spirit and purpose of my invention, and it is my intention to cover by my claims, any modified methods or use of equivalents which may be reasonably included within their scope.

I claim:

1. In combination, a wheel rim, a pneumatic tire on said wheel rim, and a metallic ribbon extending around on the inside of said tire and having its two end portions extending outwardly between the tire and wheel rim, and communicating with the outside atmosphere.

2. In combination, a wheel rim, a pneumatic tire on said wheel rim, and a metallic ribbon extending around on the inside of said tire and having its two end portions coated with resilient material and extending outwardly between its tire and wheel rim, with its metallic end edges exposed to the outside atmosphere.

3. In combination, a wheel rim, a pneumatic tire on said wheel rim, a metallic ribbon extending around on the inside of said tire and having its two end portions extending outwardly between the tire and wheel rim, and communicating with the outside atmosphere, and an elongated cord secured to the elongated length of said metallic ribbon.

4. In combination, a wheel rim, a pneumatic tire on said wheel rim, a metallic ribbon extending around on the inside of said tire and having its two end portions extending outwardly between the tire and wheel rim, and communicating with the outside atmosphere, and a means for securing said ribbon to said tire along the center inside circumference of said tire.

References Cited in the file of this patent

UNITED STATES PATENTS

| | | |
|---|---|---|
| 589,434 | Hooper | Sept. 7, 1897 |
| 780,519 | Mitchell | Jan. 24, 1905 |
| 2,290,670 | Bull | July 21, 1942 |
| 2,521,305 | Olson | Sept. 5, 1950 |